US006044190A

United States Patent [19]
Kashyap

[11] Patent Number: 6,044,190
[45] Date of Patent: Mar. 28, 2000

[54] OPTICAL WAVEGUIDE STRUCTURE

[75] Inventor: Raman Kashyap, Ipswich, United Kingdom

[73] Assignee: British Telecommunications public limited company, London, United Kingdom

[21] Appl. No.: 09/068,084

[22] PCT Filed: Jan. 30, 1997

[86] PCT No.: PCT/GB97/00266

§ 371 Date: May 4, 1998

§ 102(e) Date: May 4, 1998

[87] PCT Pub. No.: WO97/28481

PCT Pub. Date: Aug. 7, 1997

[30] Foreign Application Priority Data

Jan. 30, 1996 [EP] European Pat. Off. ............. 96300638

[51] Int. Cl.⁷ ...................................................... G02B 6/02
[52] U.S. Cl. ............................... 385/123; 385/40; 385/8; 385/129
[58] Field of Search ..................... 385/123–129, 385/147, 2, 8, 11, 40

[56] References Cited

U.S. PATENT DOCUMENTS

| 5,265,178 | 11/1993 | Braun et al. ............................... 385/24 |
| 5,561,749 | 4/1997 | Brueck et al. ........................... 385/122 |
| 5,768,462 | 6/1998 | Monte ...................................... 385/123 |

FOREIGN PATENT DOCUMENTS

| 0 193 852 | 9/1986 | European Pat. Off. . |
| 0 540 386 | 5/1993 | European Pat. Off. . |
| 62-133423 | 6/1987 | Japan . |
| 1-010212 | 1/1989 | Japan . |
| 2 241 348 | 8/1991 | United Kingdom . |
| WO 87 07255 | 3/1987 | WIPO . |
| WO 90 08970 | 8/1990 | WIPO . |
| WO 96 16344 | 5/1996 | WIPO . |
| WO 97/28481 | 8/1997 | WIPO . |

OTHER PUBLICATIONS

Applied Physics Letters, Jan. 16, 1995, USA, vol. 66, No. 3, pp. 274–276, Marx et al, "Low–loss strain induced optical waveguides in strontium barium niobate ($Sr_{0.6}/Ba_{0.4}Nb_2O_6$) at 1.3 m$\mu$ m wavelength".

Abe et al, "Electro–Optic Switch Constructed with a Poled Silica–Based Waveguide on a Si Substrate", Electronics Letter, vol. 32, No. 10, May 9, 1996, pp. 893–894 XP000593720.

Fujiware et al, "Electro–Optic Modulation in Germanosilicate Fibre with UV–Excited Poling", Electronics Letters, vol. 31, No. 7 Mar. 30, 1995, pp.573–575, XP000504320.

*Primary Examiner*—Phan T. H. Palmer
*Attorney, Agent, or Firm*—Nixon & Vanderhye P.C.

[57] ABSTRACT

An optical fibre is formed with longitudinal recesses (11, 12) which extend toward its core (3) through cladding region (2). The recesses receive electrode structures (20a, b) made of glass, which include tongues (23a, b) that fit into the recesses, on which metal electrode strips (a, b) are formed. A potential difference applied between the strips (a, b) can induce electro-optic effects in the core.

21 Claims, 6 Drawing Sheets

OPTICAL WAVEGUIDE STRUCTURE

BACKGROUND OF THE INVENTION

1. Field of the Invention

This invention relates to an optical waveguide structure in which an electric field may be applied to achieve electro-optic effects, and has particular application to optical fibres.

2. Related Art

It is well known that lithium niobate changes its optical characteristics in response to an applied electric field and can be used as an electro-optic modulator or a non-linear optical element, particularly in an optical fibre. However, it has a number of drawbacks, particularly high coupling losses when coupled to a standard fibre and a low-photorefractive damage threshold, which have prompted an investigation of the electro-optic effects of glassy materials and in particular silica.

Thermally assisted poling of silica has been known to induce electro-optic coefficients in both bulk silica and optical fibres, and reference is directed to L. Li & D. N. Payne "Permanently-Induced Linear Electro-Optic Effect in Silica Optical Fibres, Dig. Conf. Integrated and Guided Wave Optics, 1989 OSA, Paper TuAA2-1 (1989). However, the coefficient induced in this way is not sufficiently high to allow practical devices to be constructed.

It has recently been found that germanosilicate fibre, which is photosensitive to u.v. light, can be photo-excited with incident u.v. radiation to produce an electro-optic coefficient comparable to that of lithium niobate. Reference is directed to T. Fujiwara, D. Wong, Y. Zhao, S. Fleming, V. Grishina & S. Poole, "UV-Excited Poling and Electrically Tunable Bragg Gratings in a Germanosilicate Fibre", Post-deadline Paper OFC '95 (Feb '95). The u.v. technique has a significant further advantage over thermal poling in that it permits the writing of gratings and other structures in the fibre.

In order to achieve a sufficiently high applied field for the fibre, it is has previously been proposed to modify a conventional germanosilicate fibre which has a Ge doped core of relatively high refractive index surrounded by $SiO_2$ cladding of relatively low refractive index, so as to include longitudinal apertures in the cladding to receive electrodes in the form of metal wires running generally parallel to the core on opposite sides. By placing the electrodes close to the core, within the cladding, a sufficiently high field can be developed across the core in order to induce changes in the refractive index of the core. Reference is directed to S. C. Fleming, T. Fujiwara and D. Wong "UV Excited Poling of Germanosilicate Fibre" OSA '95 Photosensitive non-linearity in Glass waveguides - Fundamentals and Applications, OSA Technical Digest Vol. 22 1995. The fibre was fabricated by milling a pair of holes into the end face of a preform close to its core and positioned diametrically across the core with respect to one another. The preform was then drawn into fibre in a conventional manner so as to form a fibre with a core diameter of 8 μm and a spacing of 18 μm between the apertures that receive the electrodes. The apertures were of a diameter of the order of 70 μm and the electrodes wires had a diameter of the order of 50 μm. The electrode length was in one example 6 cm.

A disadvantage of this structure is that the electrodes need to be inserted into the fibre after formation. It will be seen that the electrode wires are of very small diameter and consequently difficult to handle. Furthermore, because the structures are so small, the electrodes have to be arranged to extend out of the apertures at opposite ends of the device in order to avoid risk of them touching, which therefore requires long connection leads. The entry of the leads in end faces of the fibre makes it very difficult to splice the fibre to conventional optical fibres, so that it cannot be included readily in optical circuits. Conventional fusion splicing could not be used because the heat required causes air in the holes to expand and distort or damage the heat softened glass of the fibre. Also, the holes need to be of a larger diameter than the electrode wires to allow them to be fitted, with the result that they are not held at a fixed distance from the core of the fibre. This can result in a non-uniform field being applied, in use, along the fibre.

Partial removal of the cladding of a fibre has been proposed in U.S. Pat. No. 5,265,178 for the purpose of allowing a doped polymer to be placed close to the optical fibre for modulation purposes, rather than for applying a field to the core. Planar structures with modulating electrodes have been proposed in "Low-loss Strain Induced Optical Waveguides in Strontium Barium Niobate at 1.3 μm wavelength", J. M. Marx et al Appl. Phys. Letts. 66 (3) January 1995, pp 274–276.

SUMMARY OF THE INVENTION

The present invention provides an alternative, more robust structure for overcoming the aforesaid disadvantages of the prior art.

In accordance with the present invention, there is provided a fibre optic waveguide structure comprising: an elongate waveguide body including a core and cladding around the core, the body having an outer surface that includes longitudinally extending first and second regions, the first region being closer to the core than the second region, and electrode means on the first region to apply an electric field across the core.

The outer surface of the body may include a longitudinal recess, with the first region being disposed in the recess.

The electrode means may comprise an elongate electrode support which extends into the recess and an electrically conductive region on the support extending along the length thereof. The support may include an elongate body member with an upstanding tongue that fits into the recess. The body may be made of glass and the conductive region may comprise a metallic coating formed on the glass.

Thus, in accordance with the invention, the electrodes may be readily fitted without the need to thread fine wires into apertures, which greatly simplifies manufacture.

Alternatively, the electrode means may comprise an electrically conductive layer on the first region, such as a metallisation layer, formed by evaporation techniques. The recess can be used to form a masking effect for the deposition, so as to allow the metal to be configured selectively on the first region.

The structure according to the invention has particular application to fibre optic waveguides that include a core and a cladding made of silica glass, wherein the core is doped with Ge or B, so as to render the structure photosensitive to u.v. light. However, the invention has wide application to many other material systems.

The structure according to the invention nay be used with advantage as a phase modulator and can be made sufficiently small that a fibre structure is provided that can operate in single mode transmission.

Waveguides according to the invention may be formed by drawing from a preform, and the invention includes a method of fabricating a waveguide structure including: preparing a preform with material for forming a waveguide core surrounded by material for forming a waveguide cladding, the preform having an outer surface that includes first and second regions, the first region being closer to the core material than the second region, drawing the preform so as to produce a fibre optic waveguide with the same general cross sectional configuration as the preform but of extended length and reduced transverse dimensions, with the first and second regions running longitudinally of the length thereof, and providing an electrode that extends longitudinally over the first region of the outer surface.

The invention also includes a preform configured for use in this method.

BRIEF DESCRIPTION OF THE DRAWINGS

In order that the invention may be more fully understood an embodiment thereof will now be described by way of contrast with a prior art device as described by Fleming et al supra, reference being had to the accompanying drawings in which.

DETAILED DESCRIPTION

Figure 1:
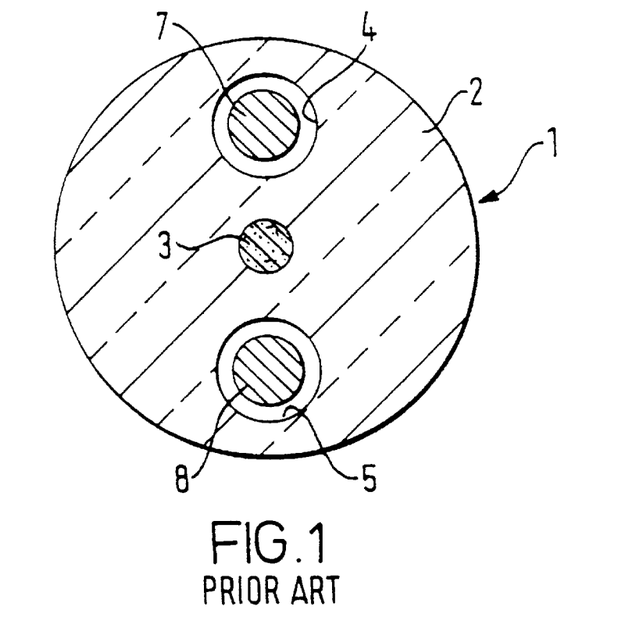
FIG. 1 is a cross-section through a prior art waveguide structure.
Figure 2:
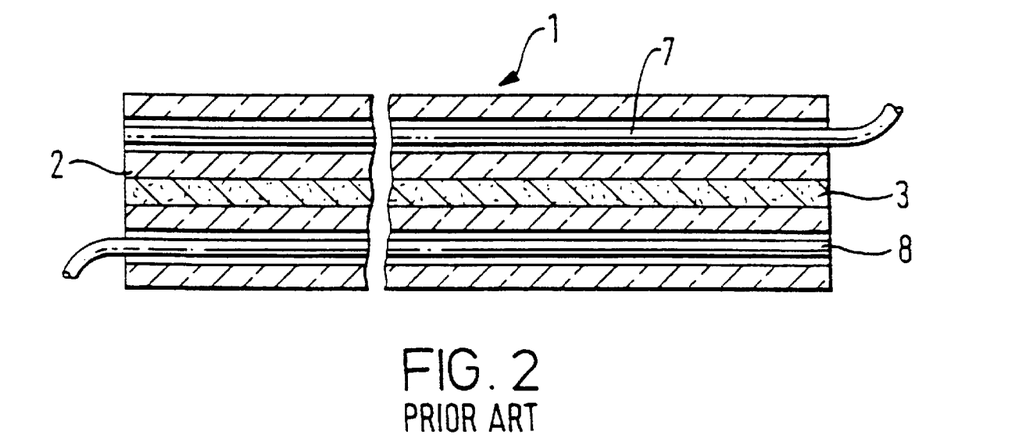
FIG. 2 is a longitudinal section of the device shown in FIG. 1.

Referring to FIGS. 1 and 2, a prior art structure is shown, as disclosed by Fleming et al supra. A silica based fibre 1 which is shown in transverse cross section in FIG. 1, has a core region 3 with a core diameter of 8 $\mu$m surrounded by SiO$_2$ cladding region 2 with an outer diameter of 125 $\mu$m. The cladding region 2 has a lower refractive index than the core 3 such that light is guided along the core in a manner well known per se The core also includes apertures 4, 5 which run longitudinally of the fibre and are positioned diametrically opposite to the core. The apertures have a diameter of 70 $\mu$m and receive electrode wires 7, 8 of diameter 50 $\mu$m. The waveguide structure is formed by drawing from a preform of the same general shape as shown in FIG. 1, in which the apertures 4, 5 are formed by drilling prior to the drawing process.

The waveguide structure has the advantage that the electrodes are placed close to the core. In one example, the hole spacing is 18 $\mu$m so that a high field strength of 100 V/$\mu$m can be achieved However, there are a number of difficulties with this structure. The small diameter of the electrodes means that they are very difficult to handle mechanically and it is difficult to thread them into the apertures 4, 5. It would be desirable to have both electrodes extend from the same end of the structure but due to the small diameter, there is a significant risk that the bare electrode wires would touch one another and produce a short circuit. For this reason, it is usual to have the wires extend out of opposite ends as shown in FIG. 2. A typical length for the structure is 6 cm with the result that the wires need to be brought together externally of the structure to a voltage source, with the disadvantage that bare electrode wires need to extend externally, which makes the device impractical. Also, because the electrode wires need to fit into the holes, they need to be a loose fit, with the result that their spacing from the core can vary along the length of the fibre. This can result in a non uniform electric field being applied across the core along the length of the fibre. Furthermore, because the electrode wires protrude from end faces of the fibre, it is difficult to splice the fibre with its protruding electrodes to conventional fibre. Fusion splicing would be problematic, due to the expansion of air in the holes 4,5 which would distort the soft glass produced by the heating used for conventional fusion splicing.

The present invention provides a solution to these problems.

Figure 3:
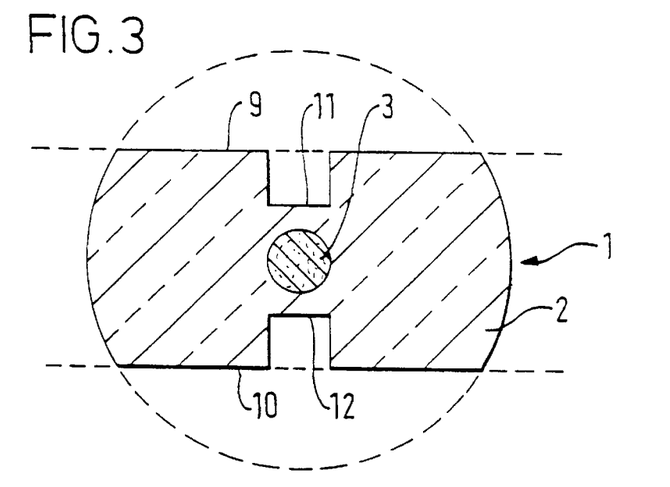
FIG. 3 illustrates a preform for use in manufacturing a waveguide structure in accordance with the invention.

Referring now to FIG. 3, this shows a preform from which a waveguide for the structure according to the invention is made. The preform consists of a generally cylindrical block of silica glass 1 which includes a central Ge or Ge and B doped region 3 that defines material for a waveguide core of relatively high refractive index surrounded by region 2 with a low dopant concentration, that provides material for a surrounding cladding of the eventual waveguide. The preform is milled so as to form opposed parallel planar surface regions 9, 10. Recess regions 11, 12 extend from the planar surface regions 9, 10 towards the core region 3.

Figure 4:
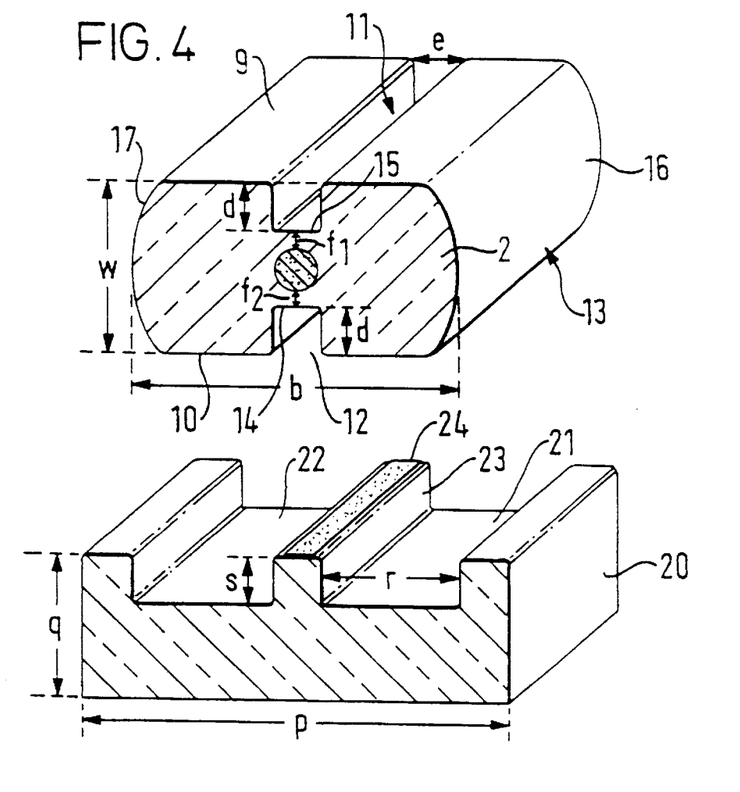
FIG. 4 is a schematic perspective view of a short length of a waveguide and one of its associated electrode structures, in accordance with the invention.

The preform is then drawn by conventional techniques to form an optical fibre and a short length of it is shown in FIG. 4, referenced 13. It can be seen that the fibre has the same general shape as the preform although its dimensions are much reduced as it is of extended length as compared with the preform. When viewed in transverse cross section, the fibre has a relatively broad dimension b in a first direction and a relatively narrow dimension w in a second direction normal to the first direction. Two recesses 11, 12 of depth d extend from planar surface regions 9, 10 towards the core 3 along the length of the fibre, the recesses having a width e. The bottom of the recesses 14, 15 are spaced from the core by distances $f_1$, $f_2$ respectively. The planar surface regions 9, 10 are connected by curved cylindrical surface regions 16, 18 that extend along the length of the fibre. An example of the dimensions of the structure are given in the following table.

| parameter | b | w | d | e | $f_1$ | $f_2$ |
|---|---|---|---|---|---|---|
| dimension | 250 µm | 100 µm | 30 µm | 26 µm | 9 µm | 15 µm |

Figure 5:
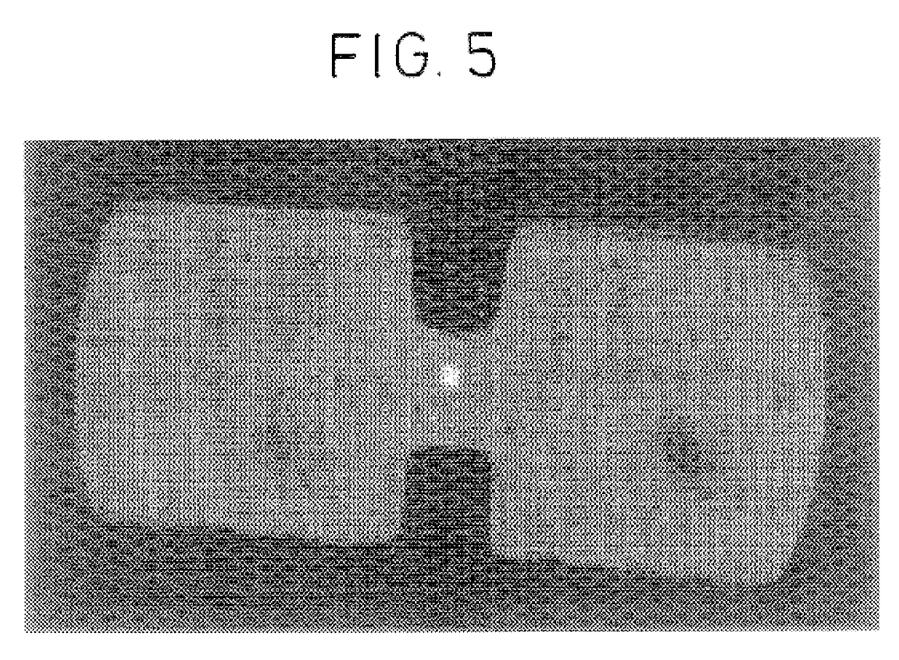
FIG. 5 is a photograph of a section through a sample of a waveguide, corresponding to the waveguide shown in FIG. 4.

The refractive index of the cladding material 2 in this example is 1.454 and the difference δn between the refractive index of the core and cladding is 0.01. A photograph of a sample of the waveguide is shown in FIG. 5. From the foregoing it will be understood that the bottom of the recesses 11, 12 form first surface regions of the fibre optic waveguide body and the remainder of the outer surface of the body, namely the planar surface regions 9, 10 and the curved surface region 16, 17, form second surface regions which are disposed further away from the core than the first surface regions.

This structure has the advantage that an electrode can be placed in each of the recesses 11, 12, over the first surface regions, applied across the core 3. Furthermore, the electrodes can be placed at non-equal distances from the core, where $f_1 \neq f_2$ in order to produce an asymmetrical electric field, if desired.

A suitable form of electrode structure 20 is shown in FIG. 4 and comprises an elongate support made of u.v. transparent glass, which has been etched, milled, sawed or otherwise cut so as to form elongate symmetrical channels 21, 22 that define an upstanding tongue 23 on which is deposited a metallic coating 24. The metallic coating 24 may be deposited using conventional photolithography techniques, prior to the formation of the channels 21, 22. The support 20 has a width p and a height q with each of the channels 21, 22 being of a width r and depth s. An example of the dimensional parameters is set out in the table below.

| parameter | p | q | r | s |
|---|---|---|---|---|
| dimension | 5000 µm | 5000 µm | 113 µm | 35 µm |

It will be seen that the tongue 23 of the support 20 is dimensioned so as to fit into the recess 12.

Figure 6:
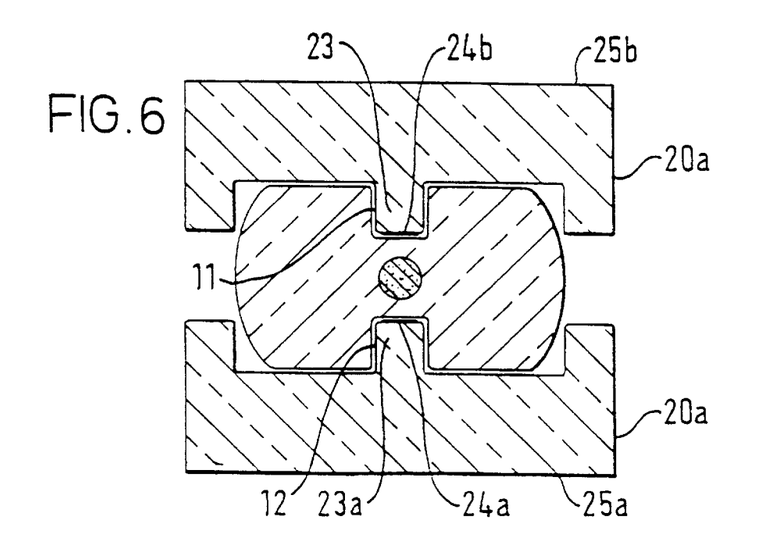
FIG. 6 is a sectional view of the entire waveguide structure in accordance with an example of the invention.

A similar support is provided with a tongue that fits into recess 11 and the resulting structure is shown in cross section in FIG. 6 in which the electrode supports are referenced 20a and b respectively. It can be seen from FIG. 6 that the metallic layers 24a, b can readily be inserted into the recesses 11, 12 so as to be disposed in close proximity with the core and thereby enable an electric field to be developed across the core to alter its optical characteristics. The metallic layers 24a, b can be run at the ends of the supports 20a, b onto exterior surfaces 25a, b over side edges of the supports so as to provide external contact pads for providing a convenient external connection.

It will be appreciated that assembly of the structure is relatively simple as compared with the described prior because the component parts merely need to be push ed together with no complex threading of electrodes as hitherto.

As previously described, the core 3 of the structure is photosensitive to u.v. light. When doped with Ge or Ge and B, it is photosensitive to radiation with a wavelength of 244 nm. Consequently, if desired, a refractive index Bragg grating can be written into the core e.g. using a phase mask.

Reference is directed to G. Meltz et al "Formation of Bragg Gratings in Optical Fibres by Transverse Holographic Method" Opt. Lett. Vol. 14, No. 15, 823 (1989). Furthermore, a poled structure can be recorded in the fibre, by recording a u.v. pattern with an electric field applied between the electrodes formed by the layers 24a, b in the manner described in Fujiwar et al, supra. Further details of fibre poling methods can be found in "Phase material second-harmonic generation by periodic poling of fused silica" R. Kashyap et al, Appl. Phys. Lett. 64(11), 14 March 1994 pp 1332–1334; "High second-order nonlinearities in poled silicate fibres" P. G. Kazansky et al, Optics Letters, 15 May 1994, Vol. 19, No. 10, pp 701–703 and "Electro-optic phase modulation in a silica channel waveguide", A. C. Liu et al, Optics Letters, Vol. 19, No. 7, 1 April 1994, pp 466–468. The resulting refractive index grating can then be tuned by the application of a electric field which alters the refractive index of the core by applying a voltage to the metallic layers 24a, b. Furthermore, the device can be used as a phase modulator when no Bragg grating is recorded. The applied field alters the refractive index of the core and thus introduces a phase shift for optical signals traveling along the fibre. This can be used with advantage in a Mach Zehnder interferometer or in other optical devices.

The structure according to the invention has the advantage that it can be manufactured in long lengths e.g. 50 cm or more whereas in the prior art, it was difficult to construct devices longer than 10 cm.

Figure 7:
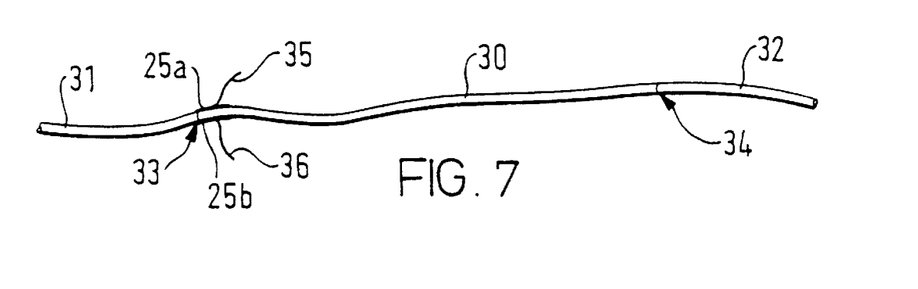
FIG. 7 illustrates a fibre in accordance with the invention fusion spliced to conventional optical fibre at both ends.

The structure can readily be spliced to conventional optical waveguides and FIG. 7 shows a length of the waveguide structure 30 constructed as described with reference to FIG. 6, spliced to lengths 31, 32 of silica based optical fibre. Fusion splices are formed at 33 and 34 by conventional techniques well known to those skilled in the art. Electrode wires 35, 36 are connected to the metallic layers a,b which are run onto the surfaces a,b as described with reference to FIG. 6. Thus, the ends of the structure are free of electrode wires and can be joined by fusion splicing or other conventional butt joining techniques to optical fibres 31, 32. In FIG. 7 the wires 35, 36 are shown at the same end of the waveguide structure, but they could be at opposite ends.

Figure 8:
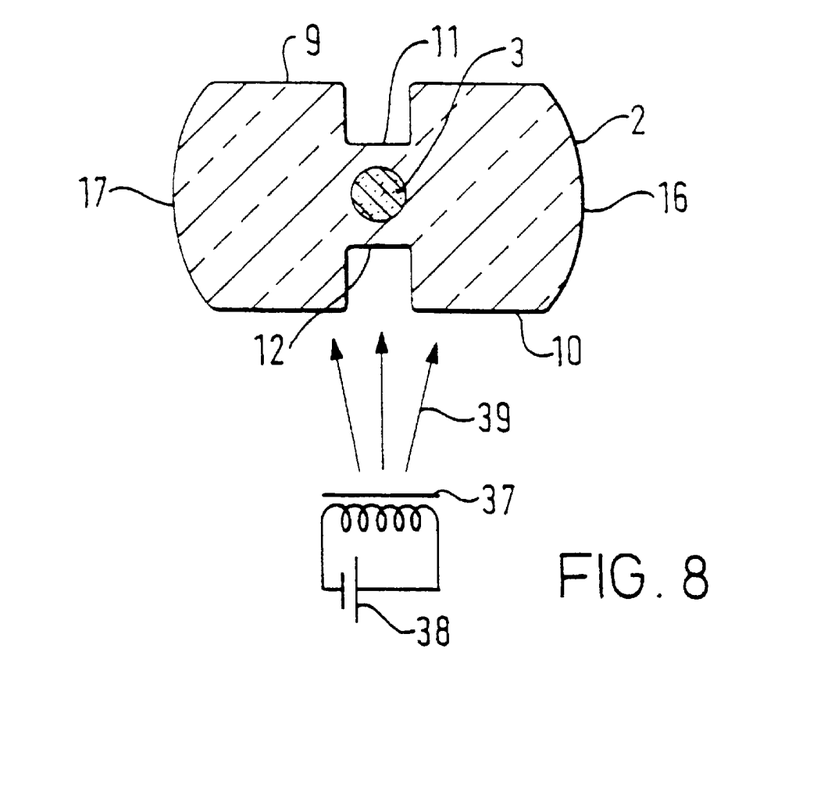
FIG. 8 illustrates an alternative way of depositing an electrode in the recesses of the fibre.
Figure 9:
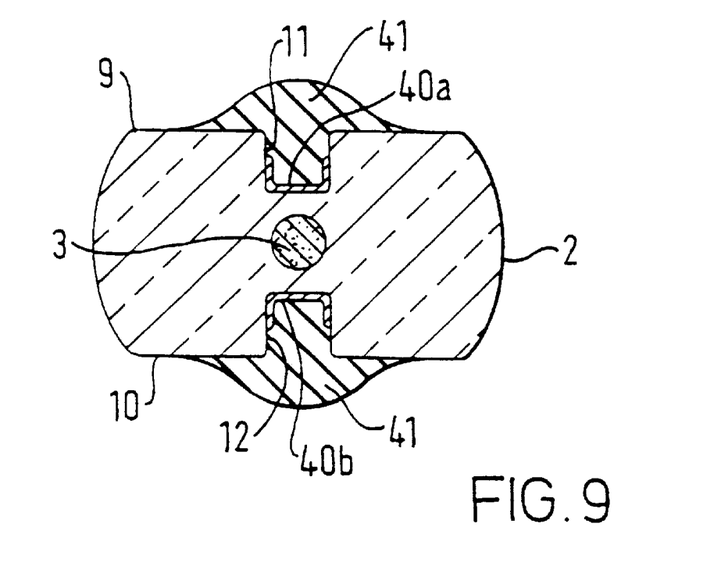
FIG. 9 illustrates a fibre of FIG. 8, after deposition of the electrodes and with the recesses filled with an insulating material.

An alternative way forming the electrode structures is shown in FIGS. 8 and 9. In this example, metallisation layers are formed directly within the recesses 11, 12. Referring to FIG. 8, gold is evaporated by conventional techniques, using a resistive heater 37 driven by an electrical power source 38 in a vacuum chamber (not shown). Au vapour travels in the direction of arrows 39 so as to become deposited on the first surface region, namely the bottom of recess 12. Similar deposition is carried out on the bottom of recess 11. A gold layer is not significantly deposited on the side walls of the recesses 11, 12 but deposition does occur on the planar surfaces 9, 10. The Au layer on surfaces 9, 10 is removed subsequently either by rubbing or by using a self-adhesive tape applied to the surfaces to lift off the gold. Thus, the recesses 11, 12 can be used to self-mask the deposited electrodes.

Thus, referring to FIG. 9, metallisation layers 40a, b formed of the deposited Au material extend along the bottom of the recesses 11, 12 so as to provide the electrodes. Thereafter, the recesses may be filled with a suitable material 41, such as an electrically insulating compound such as silicon rubber so as to protect the fibre from dielectric breakdown and flash-over. This configuration has the advantage that separate glass electrode structures as shown in FIG. 4 do not need to be fired to the fibre. It will be understood that other metallisation layers could be used, instead of Au. Also, non-metallic electrically conductive materials may be used, such polycrystalline silicon.

Many different, specific designs of fibre fall within the scope of the invention and a number of alternatives will now be described by way of example.

Figure 10:
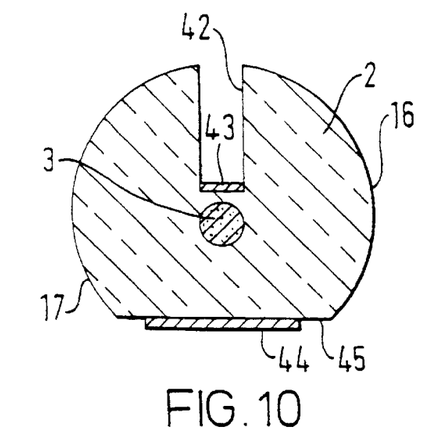
FIG. 10 illustrates in cross section an alternative embodiment of optical fibre in accordance with the invention with a single generally rectangular recess.

Referring to FIG. 10, an alternative fibre cross section in accordance with the invention is shown, which includes a single rectangular recess 42 containing a metallic deposited electrode 43, formed in the manner described with reference to FIGS. 8 and 9. A second electrode 44 is formed by a vapour deposition on a planar surface 45 on the opposite side of the fibre 2 to the electrode 43. It will be understood that the fibre is drawn from a correspondingly shaped preform of large dimensions in the manner previously described with reference to FIG. 3, 4 and 5. The edges of the second electrode 44 may be defied by selectively rubbing the curved surfaces 16, 17 of the fibre to remove any deposited metallic material therefrom, so as to leave the materials selectively on the surface 45. Alternatively, a suitable conventional masking technique may be used during the vapour deposition process.

Figure 11:
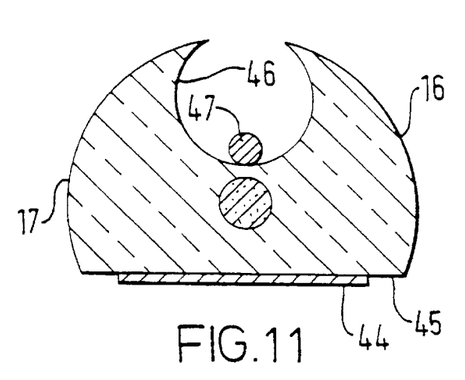
FIG. 11 illustrates an alternative fibre in accordance with the invention, with a curved recess that includes a filamentary electrode.
Figure 12:
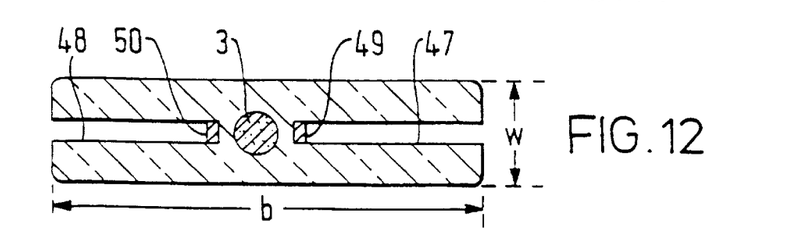
FIG. 12 illustrates a cross section through a tape fibre in accordance with the invention.

Referring to FIG. 11, another version of the fibre is shown, which is similar to that of FIG. 10, in which the lowermost electrode 44 is formed on a planar surface 45 in the manner previously described. However, recess 46 has a generally curved cross section and the electrode 47 is formed by a filamentary element which is physically fitted within the recess 46. It will be understood that the fitting of the element 47 is much simpler than in the prior art because it is not necessary actually to thread the element through an aperture; instead it is laid in the recess 46 from outside the fibre. Furthermore, since only one filamentary element 47 is used, the possibility of it touching the other electrode 44 is materially reduced Referring to FIG. 12, the optical fibre is in the form of a tape of cross sectional width dimension w=50 µm and a cross sectional breadth dimension b=1 mm. The tape fibre includes longitudinal recesses 47, 48 that extend from the outer surface of the waveguide body towards the core 3 of the fibre, on opposite sides thereof. The base of each of the recesses 47, 48 is coated with a metallic, deposited conductive layer 49, 50 to form electrodes which allow an electric field to be applied across the core 3. As shown in FIG. 12, the core may be disposed asymmetrically between the electrodes 49, 50. A typical example of the diameter of the core is 8 µm.

Figures 13, 14:
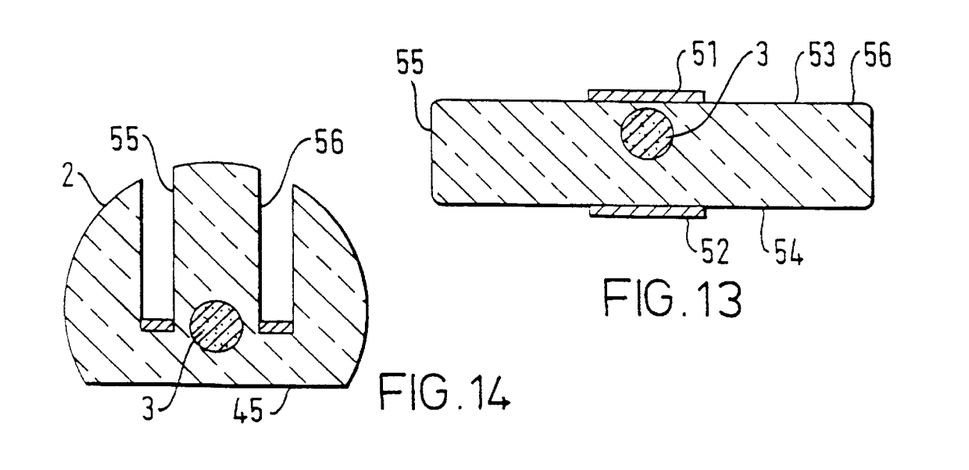
FIG. 13 illustrates a transverse cross section of another tape fibre in accordance with the invention.
FIG. 14 illustrates a cross section of a fibre in accordance with the invention with two recesses that enter the fibre from the same side.

An alternative arrangement is shown in FIG. 13, in which the tape fibre has the same dimensions as shown in FIG. 12 but instead of providing recesses, the electrodes comprise metallisation layers 51, 52 formed on the exterior body of the waveguide, on first surface regions 53, 54 that are closer to the core than opposed second regions 55, 56. It will be seen that the core 2 is disposed asymmetrically between the electrodes 51, 52.

Referring to FIG. 14, another fibre optic waveguide cross section is shown, which includes a flat surface 45, corresponding to the surface shown in FIG. 11, together with first and second recesses 55, 56, which extend from the same side of the fibre, in parallel, on opposite sides of the core 3, into the cladding region 2.

It will be understood that all of the embodiments shown in FIGS. 10 to 14 are formed by drawing from a preform of corresponding shape, in the manner generally described with reference to FIG. 3 and 4. The preform for each of the embodiments of FIGS. 10 to 14 may be made of materials as described with reference to FIG. 3 and the core dimension may be generally similar also.

Many modifications and variations of the described inventive structure are possible. For example it would be possible to construct a device including two cores spaced apart in a common cladding, each having an associated pair of recesses such as 11 and 12 shown in FIG. 6, and the electrode supports 20 having more than one tongue so as to fit into the recesses for each of the cores.

Furthermore, whilst the device has been described in relation to the a germanosilicate fibre, the invention is not limited to these materials and can be used with any suitable material that exhibits an electro-optic characteristic.

What is claimed is:

1. A fibre optic waveguide structure comprising:
   an elongate waveguide body including a core and cladding around the core,
   the body having an outer surface that includes a longitudinally extending recess, and
   electrode means in the recess to apply an electric field across the core.

2. A structure as in claim 1 wherein the electrode means includes an elongate electrode support in the recess, and an electrically conductive region on the support extending along the length thereof.

3. A structure as in claim 2 wherein the support includes an elongate body member with an upstanding tongue which fits into the recess along the length thereof.

4. A structure as in claim 2 wherein the support is made of glass and the conductive region comprises a metallic coating formed on the glass.

5. A structure as in claim 1 including first and second of said recesses, and first and second of said electrode means in the recesses respectively, the core being disposed between the electrode means.

6. A structure as in claim 5 wherein the outer surface has an external surface which includes a planar surface regions which extend longitudinally of the waveguide, and generally cylindrical surface regions which extend between the opposed planar regions, the recesses being disposed in the planar regions respectively so as to extend towards the core.

7. A structure as in claim 5 wherein the outer surface of the cladding includes longitudinal planar surface regions curved generally cylindrical surface regions which extend between the opposed planar regions, the recesses being formed in the planar regions respectively to as to extend towards the core.

8. A structure as in claim 1 wherein the waveguide, in transverse cross section, has a relatively broad dimension (b) in a first direction and a relatively narrow dimension (w) in a second direction extending transversely of the first direction, and the recess extends inwardly from the exterior of the cladding towards the core in said second direction.

9. A structure as in claim 8 wherein said broad dimension (b) is about 250 µm, said narrow dimension (w) is about 100 µm, and the recess has a depth (d) of about 30 µm.

10. A structure as in claim 1, coupled at an end thereof to another fibre optic waveguide.

11. A structure as in claim 10 wherein the coupling comprises a fusion splice.

12. A structure as in claim 1 wherein the electrode means comprises an electrically conductive layer in the recess.

13. A structure as in claim 1 wherein the waveguide is formed of silica glass that has been doped to provide the core.

14. A structure as in claim 13 wherein the core dopant includes Ge and B.

15. A structure as in claim 1 configured to operate phase modulator.

16. A structure as in claim 1 operable in single mode transmission.

17. A structure as in claim 1 including a grating in the fibre.

18. An optical waveguide structure comprising:

an elongate generally cylindrical light guiding waveguide body having a longitudinal outer surface, that includes material which has been photo-excited to a poled condition so as to exhibit an electro-optic coefficient, and electrode means for applying an electric field into the waveguide body to alter said electro-optic coefficient, wherein the longitudinal outer surface includes at least one longitudinal recess, and the electrode means is disposed in the recess to apply the electric field into the waveguide body along the length thereof.

19. A fibre optic waveguide structure comprising:

an elongate waveguide body including a core and cladding around the core, the body having an outer surface that includes longitudinally extending first and second regions, the first region being closer to the core than the second region, the body including material which has been photo-excited to a poled condition so as to exhibit an electro-optic coefficient, and electrode means on the first region to apply an electric field across the core.

20. A method of fabricating a waveguide structure including:

preparing a preform with material for forming a waveguide core surrounded by material for forming a waveguide cladding, the preform having an outer surface that includes a recess, drawing the preform so as to produce a fibre optic waveguide with the same general cross sectional configuration as the preform but of extended length and reduced transverse dimensions, with the recess running longitudinally of the length thereof, and providing an electrode that extends longitudinally in the recess to apply an electric field to the core.

21. A fibre optic waveguide made by a method as in claim 20.

* * * * *